United States Patent [19]

Cantoni

[11] Patent Number: 4,629,479

[45] Date of Patent: Dec. 16, 1986

[54] MULTIPLE FILTER UNIT

[75] Inventor: Maria C. Cantoni, Rome, Italy

[73] Assignee: Ital Idee s.r.l., Rome, Italy

[21] Appl. No.: 733,801

[22] Filed: May 14, 1985

[30] Foreign Application Priority Data

May 15, 1984 [IT] Italy .................... 48201 A/84

[51] Int. Cl.⁴ .................. B01D 39/00; B01D 46/00
[52] U.S. Cl. ............................. 55/274; 55/126;
55/316; 55/357; 55/471; 55/485
[58] Field of Search ............... 55/124, 126, 274, 316,
55/322, 323, 356, 357, 471, 473, 485

[56] References Cited

U.S. PATENT DOCUMENTS 4,253,852 3/1981 Adams .................. 55/126

Primary Examiner—Robert Spitzer
Attorney, Agent, or Firm—Fleit, Jacobson, Cohn & Price

[57] ABSTRACT

A multiple filter unit in the form of a complete interchangeable unit for insertion into a motor vehicle interior ventilation duct, or into the mouth of air conditioners or into suction-producing apparatus for closed environments, including a rigid casing provided with retention and sealing means, a series of filter elements and/or chemical products and/or electrostatic filtering devices disposed in a predetermined order for filtering solid particulate matter, mists and air pollutant gases, and means for checking the degree of efficiency.

21 Claims, 4 Drawing Figures

MULTIPLE FILTER UNIT

BACKGROUND OF THE INVENTION

The present invention relates to a multiple filter unit for purifying air, in particular for motor vehicles or closed environments, and insertable into ventilation and air conditioning systems. Technical development has inevitably led to chemical, physical or biological alterations of the environment. Atmospheric pollution is itself a chemical-physical alteration of the air. The alteration is natural when it relates to bacteria, gas of volcanic origin, marine aerosols and the like. In contrast, it is artificial if due to combustion systems, industrial plants or motorisation. Any type of combustion leads to final products which have to be dispersed and settled. These are constituted by oxygenated carbon compounds, unburnt hydrocarbons, nitrogen oxides, oxygenated sulphur compounds, water vapour and unburnt or incombustible solid particles. With regard to industrial plants, the fact that they are located in relatively small determined areas leads to a very high concentration of industrial emissions. The main industrial pollutants are oxygenated carbon compounds, nitrogen oxides, sulphur trioxide, hydrocarbons and solid particles. Motor vehicle engines themselves emit large quantities of pollutants, especially in the gaseous state, including carbon monoxide, unburnt hydrocarbons and nitrogen oxides. There are various pollutant removal methods, which can be grouped into five categories: (a) conversion of the gaseous pollutant into another product and recovery of the new substance; (b) decomposition of the gaseous pollutants and conversion into innocuous products; (c) conversion into easily eliminated products; (d) elimination of gaseous pollutants by cooling and condensation; (e) elimination by absorption in liquid or adsorption on a solid.

Studies carried out in Italian urban areas have demonstrated the influence which atmospheric conditions and seasonal cycles have on pollution. In this respect, particularly in winter, when wind is absent a stable system forms which tends to trap emissions, which are essentially of domestic (heating) and vehicle origin. As the day progresses, pollution high points are observed depending on the particular moment. In contrast, during summer all values decrease and are more uniform. Again, pollution is not uniform over the entire urban area, but depends on the closeness or otherwise of industries, the roads of greatest circulation, and whether tree-containing areas are present. It is however general, and extends also to roads outside the town, where it is naturally proportional to the intensity of the traffic using them.

In order to combat pollution, industries already use purifiers. Special foamed material is able to retain particulate matter. Filters with activated carbon are used on cooker hoods without a discharge duct. The army, the fire service and police use protective masks for high gas, fume and dust concentrations. Catalysts for application to the exhaust pipes of internal combustion engines using leadless petrol have been designed in order to prevent their very rapid deterioration. In large, closed environments such as factories, cinemas, restaurants and the like, central air treatment plants are already installed, but are generally limited to solid particulate matter, so that the air which is introduced is not clean but contains pollutant substances. The air normally breathed in automobiles, offices and small closed environments is also polluted by the air originating from the outside.

SUMMARY OF THE INVENTION

The present invention obviates the aforesaid drawbacks by treating the air originating from the outside and purifying it before it is introduced into the environment by a fan or by dynamic suction. According to a preferred embodiment of the invention, it is possible to insert into the air inlet duct for the internal ventilation of a motor vehicle a multiple filter unit in the form of a complete interchangeable and entirely replaceable unit, comprising a substantially rigid casing, for example of cardboard, plastics material or the like, having a cross-sectional shape corresponding to that of the duct into which it is inserted, but of slightly smaller dimensions.

On the outside of said casing there is provided a covering of flexible material, for example foamed material, which tapers towards the rear end of the casing in order to facilitate insertion of the filter unit into the duct, and of dimensions such as to form a forced and retention fit in the duct.

Inside the casing there is provided, according to the present invention, a series of elements of filter material and/or chemical products and possibly electrostatic devices or the like, disposed in a predetermined order so as to obtain complete filtration and purification of the indrawn air, both with regard to dust and mist elimination, and also with regard to the elimination of pollutant gas. In the considered embodiment, in the air flow direction a first element constituted by an inertial separating filter for retaining coarse solid particulate matter is followed by a perimetral spacer to enable the air stream to attain uniform distribution, a second element constituted by an inertial separating filter of finer type for solid particulate matter of smaller diameter, a third element constituted by an absolute separating filter or a sieve for retaining the smallest particles present in the stream, a fourth filter element constituted by one or more of the following types in combination with each other: a bed of granular adsorbent solids and/or selective molecular sieves for the removal of most of the main pollutant gases such as $SO_3$, $CO_2$, NO, and a fifth filter element constituted by a catalyst for mainly removing CO.

A filter element can also be impregnated with deodorant substances or mixed with deodorant granular particles for the elimination of bad odours from the automobile passenger compartment.

According to the invention, the various filter elements forming the unit are of such thickness and/or material and/or operating conditions that their degradation and life, in relation to the filtering capacity of each individual element, are substantially the same for all.

Means are also provided for facilitating gripping of the filter unit and its removal for replacement purposes, and means for checking the state of efficiency of each individual filter element or of all the elements overall. Said checking means can be constituted for example by warning strips or tapes which are either separate from each other or are joined together at that end which projects from the unit, and are disposed to the rear of each filter element, and preferably in a transverse direction, so as to be traversed by a significant air flow, and further having such dimensions and characteristics as to be put under the same conditions as the respective filter element and to indicate its effective state of efficiency.

The means for checking the state of efficiency of the filter unit can also comprise, possibly as an alternative, a device for measuring the pressure difference between the upstream and downstream side of the filter unit, and constituted for example by a tube which axially traverses all the elements of the filter unit and is associated, at one of its two ends, with a diaphragm sensitive to the pressure difference created between the upstream and downstream end of the filter unit as a function of its overall degree of clogging. The deformation of the diaphragm caused by the clogging operates known means for checking and indicating the state of efficiency, and simultaneously operates, for predetermined limiting values, means for stopping the operation of the motor vehicle fan in order to prevent it becoming damaged in the absence of the air flow. If said diaphragm associated with the axial tube is disposed to the front of the filter unit so as to be able to be inspected from the outside by direct viewing of the front end of the unit, means can be provided for blocking the limiting deformation attained by the diaphragm, or alternatively the diaphragm can be sized in such a manner as to cause it to rupture on attaining a predetermined limiting deformation indicative of overall clogging of the filter unit.

According to a further preferred embodiment, the filter unit when for closed environments or air conditioning systems comprises preferably a casing provided with a flange containing holes for screws for its fixing to a fixed structure, for example for its fixing to the inlet port of an air conditioner or to a hole in a glass pane, wall or the like, and possibly a seal gasket of known type for its application to the glass pane or wall.

Said filter unit can be formed from the same filter elements as those heretofore described, or alternatively as there are no longer any overall dimensional or feed requirements, one of the inertial separating filter elements can be replaced or flanked by a fixed electrostatic precipitator connected to the electricity mains, and said filter unit can be associated with a fan for creating the air change circulation, should said fan not already exist.

According to the invention, there are also provided means for checking the state of efficiency of the individual filter elements or of the entire overall unit, such as warning tapes or strips, or means to allow direct viewing through the transparency of the outer casing or through an axial slot formed in the casing.

DESCRIPTION OF THE DRAWINGS

These and further characteristics will be apparent from the detailed description given hereinafter by way of non-limiting example, with reference to the accompanying figures in which.

DETAILED DESCRIPTION

Figure 1:
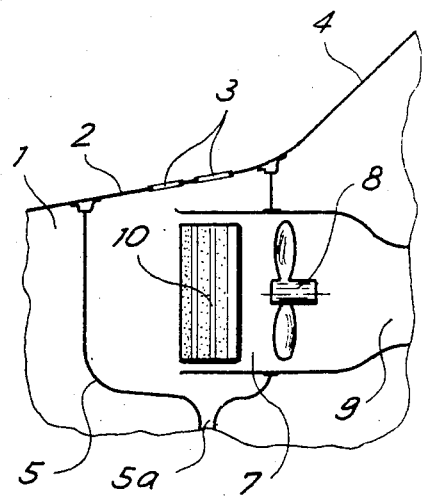
FIG. 1 is a diagrammatic representation of the filter unit inserted into a horizontal-axis air inlet port of an automobile.
Figure 2:
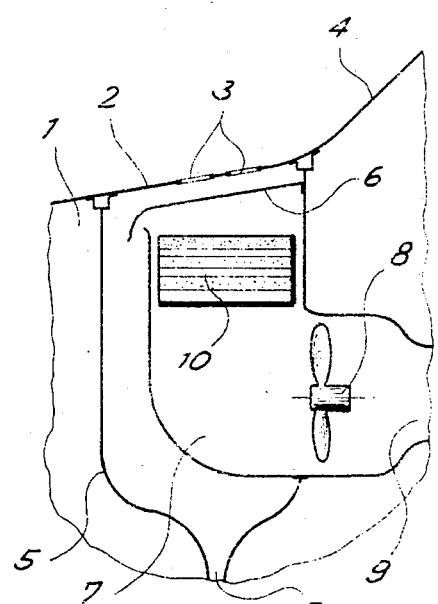
FIG. 2 is a diagrammatic representation of the filter unit inserted into a vertical-axis air inlet port of an automobile.

FIGS. 1 and 2 are a diagrammatic representation of the front zone of a motor vehicle in which the main air inlet for the internal ventilation is generally disposed inside the engine compartment 1, below the hood in a position corresponding with substantially horizontal air inlet apertures 3 disposed for example at the base of the windscreen 4.

In the arrangement shown in FIG. 1, below the air inlet apertures 3 there is situated a box 5 into which the air is conveyed from the outside. Any water is discharged through the outlet 5a.

In the arrangement shown in FIG. 2, below the air inlet apertures 3, there is provided a cap 6 of vertical axis for conveying away from the air inlet mouth any water which has entered from the apertures.

In the box 5 or below the cap 6 there is provided a duct 7 in which there is disposed an electric fan 8 which draws the external air from the mouth end of the duct 7 in order to feed it through ducting 9 to the automobile ventilation system.

Figure 3:
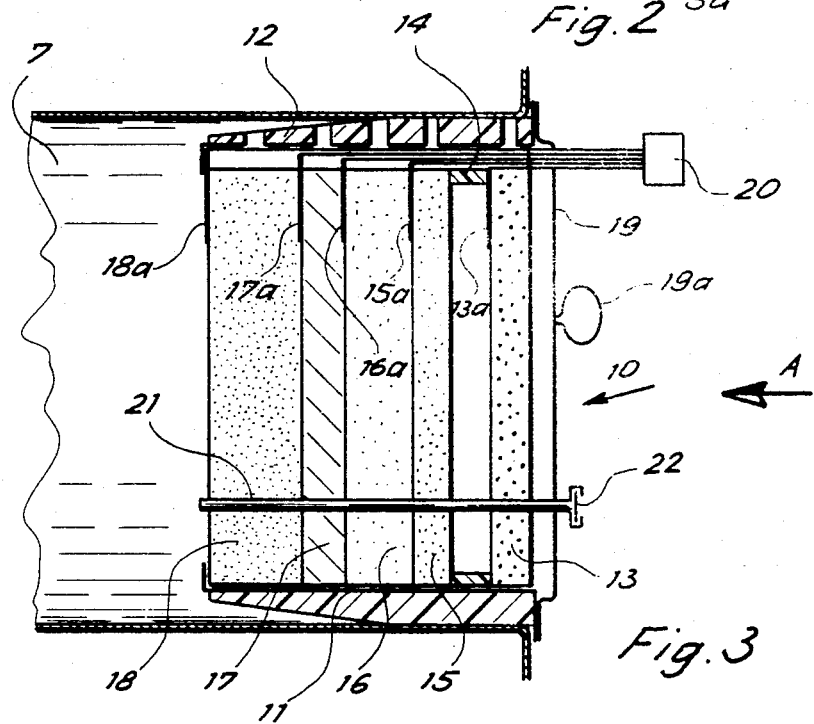
FIG. 3 is an axial section through the filter unit.

The multiple filter unit of the present invention, indicated overall by 10 and shown in detail in FIG. 3, is located in the initial part of the duct 7.

Said filter unit 10 is inserted as a complete unit and is interchangeable and completely replaceable without requiring any particular mechanical intervention.

With reference to FIG. 3, the filter unit 10 is constituted by a substantially rigid casing 11, for example of cardboard, plastics material or the like, having a cross-section corresponding to that of the duct 7 into which it is inserted, but with slightly smaller dimensions.

On the outside of said casing 11 there is provided a layer of flexible material 12, for example foamed plastics material, which slightly tapers towards the rear end of the casing 11 and is of such dimensions as to produce a forced fit inside the duct 7 when the unit 10 is inserted therein starting from the tapered end to facilitate its entry, and to create sufficient elastic pressure on the walls of the duct 7 to retain the filter unit 10 in position.

According to the present invention, inside the casing 11 there is provided a series of elements of filter material and/or chemical products, and possibly electrostatic devices or the like, disposed in a predetermined order in order to obtain complete filtration and purification of the indrawn air.

According to the invention, the filter unit 10 comprises, disposed in the air flow direction in accordance with the arrow A, a first element 13 constituted by an inertial separating filter, for example of the labyrinth type, provided for retaining coarse solid particulate matter of diameter greater than one micron, while at the same time able to offer the least possible resistance to the passage of the air, and having a high dust storage capacity. Preferably, it has been found that a filter element, for example of the polyurethane foam type, with 25 passages per $cm^2$ and an axial thickness of about 6 mm is sufficient for the purpose.

A perimetral spacer 14 of known type enables the air which has passed through the first filter element 13 to regain a certain degree of uniformity for improved efficiency of the subsequent filtering layers.

A second element 15 is constituted by a further inertial separating filter of smaller passages, downstream of which the particulate matter suspended in the fluid stream is of diameter less than one micron. Preferably, it has been found that a filter element, for example of the polyurethane foam type, with 40 passages per $cm^2$ and an axial thickness of about 6 mm is sufficient for the purpose. A third filter element 16 is constituted by an absolute separating filter, for example of sintered textile fibres or woven glass fibres, with high separation power, for retaining the smaller residual particles present in the stream.

A fourth filter element 17 is constituted by adsorbent solids for removing certain pollutant gases, fatty constituents of the air and bad odours. Preferably, it has been found that selective granular beds, for example of activated carbon, with an axial thickness of 20 mm are sufficient for the purpose.

As an alternative to, or in combination with the adsorbent solids, the fourth element can for example be a granular mixture of ASCARITE ® and lithium hydroxide on an asbestos base for adsorbing a large proportion of the acid pollutant gases such as $SO_2$, $SO_3$, $CO_2$, NO and, partially, CO. Preferably, it has been found that a layer of 20 mm axial thickness is sufficient for the purpose.

Furthermore, as an alternative to or in combination with the preceding, the fourth filter element 17 can be constituted by a molecular sieve selective for particular chemical compounds.

A fifth filter element 18 is constituted by a catalyst, the purpose of which is to fix the residual pollutant substance, particularly CO, in the form of a compound by chemical reaction.

Each of the aforesaid filters can be formed from a number of layers selective for different substances.

Furthermore according to the invention, one of the filter elements can be impregnated with a deodorant substance or mixed with deodorant granular particles, in order to eliminate bad odours inside the automobile.

On the front end of the casing 11 there is provided, rigid therewith, a transverse bar 19 provided with a gripping ring or the like 19a, for extracting the filter unit 10 from the duct 7 when the unit 10 is to be replaced.

According to the invention, the various filter elements forming the filter unit 10 are of such thickness and/or material and/or operating conditions that both their degradation and their life in relation to the filtering capacity of each element are substantially the same for all.

The life and/or the state of efficiency of each individual element or of all the elements which overall form the filter unit 10 can be checked by inserting behind each filter element 13, 15, 16, 17 and 18 a warning strip or tape which is of such material and dimensions as to behave as the filter element itself or to be influenced by it in relation to the residual degree of efficiency of the element. For example, on the rear of the first filter element 13 there is disposed a warning strip or tape 13a composed of the same material as the element 13 itself, but suitably decoloured or coloured so that as the air passage pores of the inertial separating filter 13 become clogged, the warning tape or strip 13a changes colour in relation to the retained solid particles until a limiting check colour is attained, this being predetermined by the manufacturer and suitably indicated in the instructions or in a suitable space on the casing 11.

The same procedure is followed by checking the state of efficiency of the other layers 15, 16, 17, 18 by respective warning tapes or strips 15a, 16a, 17a, 18a placed on their rear.

In order to put said warning strips or tapes 13a to 18a under the same conditions as the respective filter elements 13 to 18 and thus able to indicate the effective state of efficiency of the elements themselves, the warning tapes or strips can preferably be disposed transversely through a length such as to be traversed by a significant air flow.

According to the invention, the user can check the state of efficiency of the entire filter by extracting said warning tapes or strips one at a time at different times until one of them shows the limiting coloration conditions indicated by the manufacturer, this signifying, on the basis of the aforegoing, that all the other layers are also substantially in the same state of efficiency.

According to the invention, it is also possible to simultaneously extract all the warning tapes or strips by connecting them together at the ends which project to the outside by means of a common grip 20, to thus be able to simultaneously check the state of efficiency of each of the filter elements. In this case, it is necessary to insert more than one set of warning tapes or strips to be extracted for checking purposes at different times during the use of the filter unit 10.

As a modification, the state of efficiency of the filter unit 10 can be checked by disposing a tube 21, for example of plastics material, which passes axially through all the elements of the filter unit 10 and is associated at one of its two ends with a diaphragm 22 sensitive to increase in the pressure difference created between the upstream and downstream ends of the filter unit 10 by virtue of its progressive clogging, said diaphragm deforming as a function of this until a limiting deformation is reached on total clogging. The diaphragm 22 is associated with known electrical, visual or acoustic means for checking and displaying the deformation, and thus for indicating when the limiting deformation is attained, to indicate the state of efficiency of the filter unit 10. Simultaneously with its attaining of limiting deformation, and thus of total clogging of the filter unit 10, which results in reduced air passage, said diaphragm 22 operates means for stopping the operation of the vehicle electric fan 8, in order to prevent its operation under said conditions, thus preventing it becoming damaged.

If the diaphragm 22 is disposed at the front end of the axial tube 21, projecting from the filter unit 10, it can be inspected directly from the outside and it is possible to check when the filter unit 10 has become completely spent, either by the fact of the diaphragm 22 rupturing, it being sized for a determined limiting pressure difference value, or by the fact of the diaphragm deformation having attained a limiting position and having been blocked thereat, for example by elastic retention or the like.

This therefore prevents the filter unit 10 being able, due to forgetfulness or neglect on the part of the user, to remain in the intake duct 7 after it has become completely spent and no longer exerts its filtering and purifying action, and preventing or reducing passage of the ventilation air into the automobile, and creating both discomfort for ts occupants and the danger of damage to the automobile fan should this be put into operation.

Figure 4:
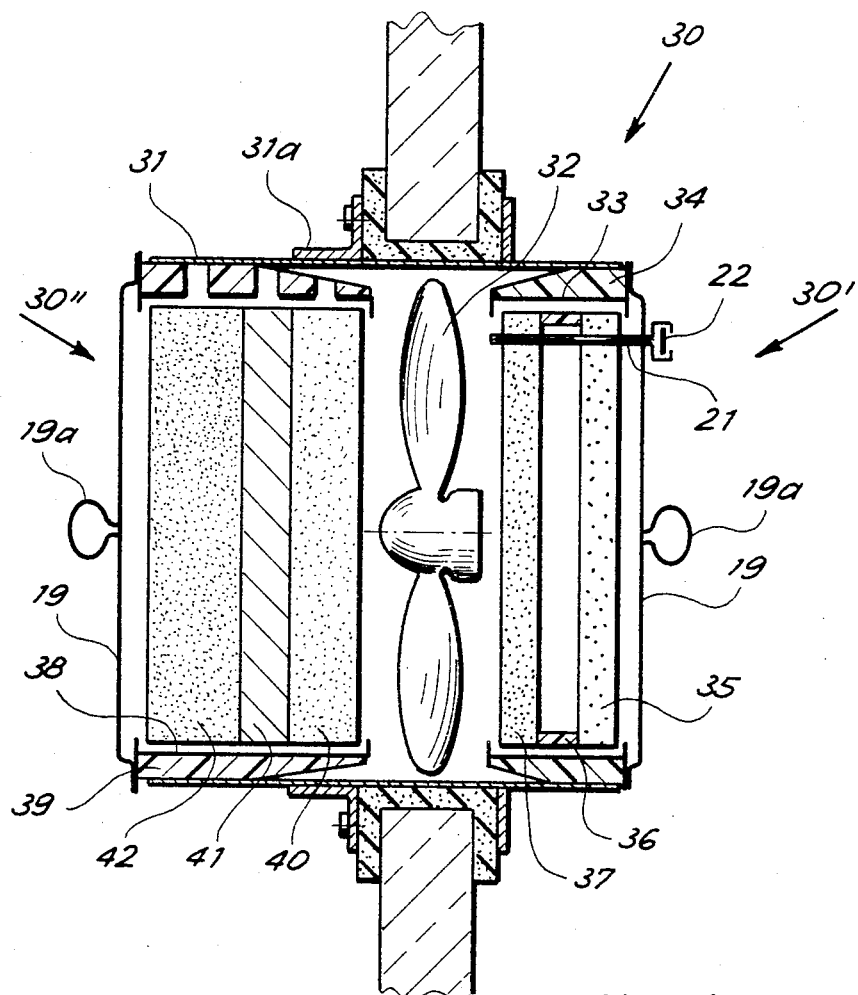
FIG. 4 shows a filter unit for closed environments.

With reference to FIG. 4, according to a further embodiment and application of the invention, the filter unit 30 is constituted by a substantially rigid outer casing or body 31, for example of metal, plastics material or the like, having a cross-section of suitable shape for fitting into seats provided either on a wall or on a glass pane. The casing 31 is preferably provided with a flange 31a with holes for the passage of screws or the like for its connection to the fixed structure, and seal gaskets of known type.

A low-speed fan 32 for creating the suction necessary for the operation of the entire filter unit 30 is fixed in known manner inside said outer rigid casing 31 and is connected to the electricity mains. The filter unit 30 for closed environments can be formed with the same filter elements already described for the motor vehicles filter unit 10 or, as an alternative to the second filter element 15 constituted preferably by an inertial separating filter, a current-fed electrostatic precipitator can be provided if there are no dimension problems or problems regarding the collection of nonconductive ducts.

In a further embodiment of the filter unit 30 and with reference to FIG. 4, the filter unit 30 contained in the outer casing or body 31 is formed from two parts 30' and 30" which are separated from each other by said fan 32.

The first filter unit 30' comprises an internal rigid casing 33 of cardboard, plastics material or the like, surrounded by a layer of flexible material 34, for example plastics foam, of such dimensions as to create sufficient elastic pressure and form a forced fit against the walls of the outer casing 31.

Said inner rigid casing 33 comprises a first element 35 constituted by a coarse inertial separating filter, a perimetral spacer 36 and a second filter element 37 constituted by a current-fed electrostatic precipitator and/or a second finer inertial separating filter. Said first filter unit 30' can be removed to allow its regeneration and thus its re-utilisation.

Downstream of the fan 32 there is a second filter unit 30" comprising a second inner rigid casing 38 of cardboard, plastics material or the like, covered externally by a layer of flexible material 39, for example plastics foam, of such dimensions as to create sufficient elastic pressure and constitute a forced fit against the inner walls of the outer casing 31.

Said inner rigid casing 38 comprises filter elements 40, 41, 42 which can be of the same type as the filter elements 16, 17, 18 of the motor vehicle filter unit 10.

According to the invention, means are also provided for checking the state of efficiency of the filter unit 30 either of the already described warning tape or strip type, or for example by directly viewing, through apertures provided in the outer casing 31 and in the inner casings 33 and 38, or through transparent casings, the colour assumed by the various elements of the filter unit 30, or other indications suitably provided for by the manufacturer, together with their relative instructions.

Obviously, if the filter unit of the present invention is to be provided for fitting into the inlet mouth of an air conditioning system or air conditioners, it can be formed from the same filter elements as already described, taking into consideration the fact that the suction created by the air conditioner itself is used for its operation, so that no fan 32 will be required.

Numerous modifications can be made to the filter unit according to the invention, in relation to the number and the succession-arrangement of the filter elements, and in relation to their type, chemical composition and formation, and further in relation to their shape and dimensions, but without leaving the scope of the present invention.

What is claimed is:

1. A multiple filter unit for motor vehicle ventilation and air conditioning systems, for introduction and stable insertion as a complete interchangeable unit into an air intake duct in motor vehicles, said filter unit comprising:
    a substantially rigid casing having a cross-sectional shape corresponding to that of the intake duct into which it is inserted, and of slightly smaller cross-sectional dimensions;
    an outer, rearwardly tapering covering of elastic, flexible material on said casing to enable said casing to be forced into and retained in said duct;
    a series of filter elements constituted by mechanical and chemical filters disposed in a predetermined order for substantially complete filtration and purification of the air;
    means for gripping and extracting the filter unit, said gripping means connected to the casing; and
    means for checking the state of efficiency of the filter unit.

2. A filter unit as claimed in claim 1, wherein said series of filter elements includes in the fluid flow direction:
    a first filter element constituted by a coarse inertial separating filter for coarse solid particulate matter of diameter greater than 1 micron;
    a perimetral spacer;
    a second filter element constituted by a finer inertial separating filter for solid particulate matter of diameter less than 1 micron;
    a third filter element constituted by an absolute separating filter for retaining residual minor particles suspended in the flow;
    a fourth filter element including means for eliminating pollutant gases;
    a fifth element, constituted by a catalyst for eliminating residual CO.

3. A filter unit as claimed in claim 2, wherein one of the filter elements includes a deodorant substance.

4. A filter unit as claimed in claim 2, wherein the individual elements of the filter unit are of such thickness and material and operating conditions that their degradation and life is substantially equal for all.

5. A filter unit as claimed in claim 4, wherein said checking means includes warning strips of the same material as the filters with colours for comparison purposes, and disposed to the rear of each individual element in a transverse direction, said strips having dimensions such as to be traversed by a significant air flow and being extractable individually for the periodical checking of the state of efficiency of the filters at successive times.

6. A filter unit as claimed in claim 5, wherein ends of the strips project out of the casing and are joined together to enable the strips to be extracted simultaneously for the periodical checking of the state of efficiency of the filter unit at successive times.

7. A filter unit as claimed in claim 4, wherein said checking means includes a tube which axially passes through all the elements of the filter unit and has at one of its ends a diaphragm sensitive to the increase in the pressure difference created between the upstream and downstream sides of the filter unit by virtue of its progressive clogging, said diaphragm being connected to at least one of electrical, visual, and acoustic means for checking and indicating deformation of the diaphragm and for signalling when a predetermined limiting deformation has been attained, said diaphragm also operating, simultaneously with the attainment of the limiting deformation on account of total clogging of the filter unit, means for stopping operation of a vehicle electric fan in order to prevent it being started under conditions which would cause it to become damaged.

8. A filter unit as claimed in claim 7, wherein said diaphragm is disposed at an upstream end of the axial tube to enable it to be directly inspected from the outside and to be able to know when the filter unit is completely spent by the fact of the diaphragm rupturing, where said diaphragm is sized for determined limiting pressure difference values.

9. A filter unit as claimed in claim 8, wherein said diaphragm is disposed at the front end of the axial tube so as to enable it to be directly inspected from the outside and to be able to be directly inspected from the outside and to be able to know when the filter unit is completely spent, by the fact of its becoming blocked by retention means in the position at which limiting deformation is attained.

10. A filter unit as claimed in claim 2, wherein said means for eliminating pollutant gases in said fourth filter element includes adsorbent solids.

11. A filter unit as claimed in claim 2, wherein said means for eliminating pollutant gases in said fourth filter element includes a selective molecular sieve.

12. A filter unit as claimed in claim 2, wherein said means for eliminating pollutant gases in said fourth filter element includes an adsorbent solid and a selective molecular sieve.

13. A multiple filter unit for closed environments, said filter unit comprising:
a rigid outer casing of a suitable cross-section for fitting into seats provided on a fixed structure, said casing including a flange with passage holes for screws for its fixing to the fixed structure, and including seal gaskets;
a filter unit assembly divided into two separate parts each contained in a rigid inner casing;
a low-speed electric fan disposed between the two filter units for creating the suction necessary for operation of the filter unit assembly, said two filter units forming an entire filter unit assembly.

14. A multiple filter unit for closed environments as claimed in claim 13, wherein a first part of the filter unit assembly comprises:
a first inner rigid casing surrounded by a layer of flexible material of such dimensions as to create a sufficient forced and retention fit inside the rigid outer casing, said first inner rigid casing containing a first filter element constituted by a coarse separating filter, a peripheral spacer and a second filter element constituted by a current-fed electrostatic precipitator and by a second inertial separating filter, said first part of the filter unit assembly being removable to allow regeneration and thus re-utilisation of the filter elements, and wherein a second part of the filter unit assembly comprises:

a second inner rigid casing surrounded by a layer of flexible material of such dimensions as to create a sufficient forced and retention fit inside the rigid outer casing, said second inner rigid casing containing a third filter element constituted by an absolute separating filter for retaining residual minor particles, a fourth filter element including means for eliminating pollutant gases, and a fifth filter element constituted by a catalyst particularly for eliminating CO.

15. A filter unit as claimed in claim 14, wherein said checking means includes means for checking the state of efficiency of each individual element of the unit, and constituted by warning strips with colours for comparison purposes, and disposed to the rear of each individual element in a transverse direction.

16. A filter unit as claimed in claim 14, wherein said means for eliminating pollutant gases in said fourth filter element includes adsorbent solids.

17. A filter unit as claimed in claim 14, wherein said means for eliminating pollutant gases in said fourth filter element includes a selective molecular sieve.

18. A filter unit as claimed in claim 14, wherein said means for eliminating pollutant gases in said fourth filter element includes an adsorbent solid and a selective molecular sieve.

19. A filter unit for closed environments, said filter unit comprising:
a rigid outer casing of a suitable cross-section for fitting into seats provided on a fixed structure, said casing including a flange with passage holes for screws for its fixing to the fixed structure, and including seal gaskets;
a filter unit assembly divided into two separate parts each contained in a rigid inner casing, said two separate parts forming an entire filter unit assembly for fitting into the inlet mouth of an air conditioning system, using for its operation suction created by said system.

20. A filter unit as claimed in claim 19, wherein the state of efficiency of the filter unit can be checked by directly viewing the colour assumed by the various elements of the filter unit itself through apertures provided in the outer and inner casings.

21. A filter unit as claimed in claim 19, wherein the state of efficiency of the filter unit can be checked by diaphragm means for measuring a pressure difference across the filter unit.

* * * * *